United States Patent
Tsujino et al.

(10) Patent No.: US 11,623,636 B2
(45) Date of Patent: Apr. 11, 2023

(54) DISPLAY DEVICE FOR VEHICLE AND PARKING ASSIST SYSTEM

(71) Applicant: HONDA MOTOR CO., LTD., Tokyo (JP)

(72) Inventors: Miki Tsujino, Saitama (JP); Yasushi Shoda, Saitama (JP); Hiroshi Yamanaka, Saitama (JP); Yuki Hara, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 252 days.

(21) Appl. No.: 17/096,020

(22) Filed: Nov. 12, 2020

(65) Prior Publication Data
US 2021/0179077 A1  Jun. 17, 2021

(30) Foreign Application Priority Data

Dec. 13, 2019  (JP) .............................. JP2019-225941

(51) Int. Cl.
*B60W 30/06* (2006.01)
*B60W 50/14* (2020.01)
(Continued)

(52) U.S. Cl.
CPC ............ *B60W 30/06* (2013.01); *B60W 10/10* (2013.01); *B60W 10/18* (2013.01); *B60W 10/20* (2013.01);
(Continued)

(58) Field of Classification Search
CPC ................ B60Q 1/22; B60K 2370/173; B60K 2370/167; B60R 1/00; B60R 2300/105;
(Continued)

(56) References Cited

U.S. PATENT DOCUMENTS

2003/0179293 A1   9/2003  Oizumi
2005/0278113 A1*  12/2005  Maruyama ....... G08G 1/096783
                                                            340/995.1

FOREIGN PATENT DOCUMENTS

JP          3855814 B2    12/2006
JP       2015074260 A      4/2015
JP       2019182046 A     10/2019

OTHER PUBLICATIONS

Notice of Reasons for Refusal for Patent Application JP 2019225941 dated Aug. 10, 2021; 10 pp.

* cited by examiner

*Primary Examiner* — Christian Chace
*Assistant Examiner* — Jordan S Fei
(74) *Attorney, Agent, or Firm* — Armstrong Teasdale LLP

(57) ABSTRACT

A display device for a vehicle includes: an image display unit configured to display a direction indicating image that indicates a travel direction of the vehicle; and a control device configured to execute travel control of the vehicle. The direction indicating image is switchable between a first image that indicates a first travel direction of the vehicle and a second image that indicates a second travel direction of the vehicle, the second travel direction being opposite to the first travel direction. In a case where the control device switches the travel direction of the vehicle from the first travel direction to the second travel direction, the image display unit switches the direction indicating image from the first image to the second image based on a vehicle speed of the vehicle, a state of a power transmission device, and a steering state of the vehicle.

9 Claims, 6 Drawing Sheets

(51) Int. Cl.
*B60W 10/10* (2012.01)
*B60W 10/18* (2012.01)
*B60W 10/20* (2006.01)

(52) U.S. Cl.
CPC ....... *B60W 50/14* (2013.01); *B60W 2050/146* (2013.01); *B60W 2420/42* (2013.01); *B60W 2510/10* (2013.01); *B60W 2510/20* (2013.01); *B60W 2520/06* (2013.01); *B60W 2520/10* (2013.01)

(58) Field of Classification Search
CPC ............ B60R 2300/70; B60T 2230/08; B60W 10/18; B60W 10/20; B60W 2510/20; B60W 30/06; B60W 30/18036; B60Y 2300/18033
See application file for complete search history.

DISPLAY DEVICE FOR VEHICLE AND PARKING ASSIST SYSTEM

TECHNICAL FIELD

The present invention relates to a display device for a vehicle and a parking assist system including the same.

BACKGROUND ART

Conventionally, when an automatic parking process or the like is executed, an image (hereinafter referred to as "direction indicating image") that indicates a travel direction of a vehicle is displayed on a display (for example, an inboard touch panel) to inform a user of the travel direction of the vehicle. For example, Japanese Patent No. 3855814 discloses an image processing device for a vehicle. When the vehicle moves forward, the image processing device causes a display means to display an image such that the front of the vehicle is on an upper side. On the other hand, when the vehicle moves backward, the image processing device causes the display means to display the above image upside down. The image processing device includes a means for automatically switching between the image at the forward movement of the vehicle and the image at the backward movement of the vehicle based on a changing operation of a shift position between a forward position and a reverse position.

However, if the direction indicating image is switched based only on the changing operation of the shift position when the travel direction of the vehicle is switched, a significant time difference is caused between a switching timing of a travel state or a steering state of the vehicle and a switching timing of the direction indicating image, which may cause the discomfort of the user.

SUMMARY OF THE INVENTION

In view of such a problem of the prior art, a primary object of the present invention is to provide a display device for a vehicle that can reduce the discomfort of the user by switching a direction indicating image at an appropriate timing in a case where the travel direction of the vehicle is switched.

To achieve such an object, one embodiment of the present invention provides a display device (3) for a vehicle (V), including: an image display unit (32) configured to display a direction indicating image (A) that indicates a travel direction of the vehicle; and a control device (15) configured to execute travel control of the vehicle, wherein the direction indicating image is switchable between a first image (Af) that indicates a first travel direction of the vehicle and a second image (Ar) that indicates a second travel direction of the vehicle, the second travel direction being opposite to the first travel direction, and in a case where the control device switches the travel direction of the vehicle from the first travel direction to the second travel direction, the image display unit switches the direction indicating image from the first image to the second image based on a vehicle speed of the vehicle, a state of a power transmission device (16), and a steering state of the vehicle.

According to this arrangement, in a case where the travel direction of the vehicle is switched, a switching timing of the direction indicating image can be determined based on the vehicle speed of the vehicle, the state of the power transmission device, and the steering state of the vehicle. Accordingly, it is possible to suppress a time difference between a switching timing of the travel state or the steering state of the vehicle and the switching timing of the direction indicating image, as compared with a case where the switching timing of the direction indicating image is determined based only on the state of the power transmission device. Thus, the direction indicating image can be switched at an appropriate timing, so that the discomfort of the user caused by the switch in the direction indicating image can be reduced.

In the above arrangement, preferably, in the case where the control device switches the travel direction of the vehicle from the first travel direction to the second travel direction, the image display unit stops displaying the first image when or after the vehicle speed in the first travel direction becomes zero, and starts displaying the second image after a period in which the direction indicating image is not displayed elapses and before the vehicle speed increases from zero.

According to this arrangement, the display of the direction indicating image is stopped as the vehicle stops moving. Accordingly, it is possible to shorten a period in which the direction indicating image is displayed even though the vehicle is stopped. Thus, the discomfort of the user caused by the switch in the direction indicating image can be further reduced. Further, the display of the second image is started before the vehicle speed increases from zero. Accordingly, the user can easily anticipate that the vehicle will move in the second travel direction.

In the above arrangement, preferably, the state of the power transmission device is switchable between a first state to move the vehicle in the first travel direction and a second state to move the vehicle in the second travel direction, and in the case where the control device switches the travel direction of the vehicle from the first travel direction to the second travel direction, the image display unit starts displaying the second image when or after the state of the power transmission device is switched from the first state to the second state.

According to this arrangement, the display of the second image is started when or after the state of the power transmission device is switched. Accordingly, it is possible to shorten a period in which the second image is displayed even though the vehicle is stopped, as compared with a case where the display of the second image is started before the state of the power transmission device is switched. Thus, the discomfort of the user caused by the switch in the direction indicating image can be further reduced.

In the above arrangement, preferably, in a case where the steering state of the vehicle is changed as the control device switches the travel direction of the vehicle from the first travel direction to the second travel direction, the image display unit starts displaying the second image when or after a change in the steering state of the vehicle is completed.

According to this arrangement, the display of the second image is started when or after an adjustment of the steering state is completed. Accordingly, it is possible to shorten a period in which the second image is displayed even though the vehicle is stopped, as compared with a case where the display of the second image is started before the adjustment of the steering state is completed. Thus, the discomfort of the user caused by the switch in the direction indicating image can be further reduced.

In the above arrangement, preferably, the image display unit suspends a display of the direction indicating image while the steering state of the vehicle is being changed.

According to this arrangement, the period in which the steering state of the vehicle is changed can match the period in which the display of the direction indicating image is suspended. Thus, the discomfort of the user caused by the switch in the direction indicating image can be further reduced.

In the above arrangement, preferably, the control device is configured to control a brake force of the vehicle, and in the case where the control device switches the travel direction of the vehicle from the first travel direction to the second travel direction, the image display unit starts displaying the second image after the vehicle that has been moving in the first travel direction stops moving by the brake force of the vehicle and before the vehicle starts moving in the second travel direction.

According to this arrangement, the user can easily anticipate that the vehicle will move in the second travel direction.

In the above arrangement, preferably, the control device is configured to control a driving force of the vehicle, and in the case where the control device switches the travel direction of the vehicle from the first travel direction to the second travel direction, the image display unit starts displaying the second image after the vehicle that has been moving in the first travel direction by the driving force of the vehicle stops moving and before the vehicle starts moving in the second travel direction.

According to this arrangement, the display of the second image can be started before the vehicle starts moving in the second travel direction. Accordingly, the user can easily anticipate that the vehicle will move in the second travel direction.

In the above arrangement, preferably, wherein the image display unit is configured to simultaneously display a plan view image (X) in which the vehicle is looked down on from right above and a travel direction image (Y) in which the travel direction of the vehicle is projected, the plan view image includes the direction indicating image, the travel direction image is switchable between a first travel direction image (Yf) that projects the first travel direction of the vehicle and a second travel direction image (Yr) that projects the second travel direction of the vehicle, and in the case where the control device switches the travel direction of the vehicle from the first travel direction to the second travel direction, the image display unit starts displaying the second image when the travel direction image is switched from the first travel direction image to the second travel direction image.

According to this arrangement, a display timing of the second image can match a switching timing of the travel direction image. Thus, the discomfort of the user caused by the switch in the direction indicating image can be further reduced.

In the above arrangement, preferably, the first travel direction is one of a forward direction and a reverse direction of the vehicle, and the second travel direction is another of the forward direction and the reverse direction of the vehicle.

According to this arrangement, in a case where the travel direction of the vehicle is switched between the forward direction and the reverse direction, the direction indicating image can be switched at an appropriate timing, so that the discomfort of the user can be reduced.

In the above arrangement, preferably, the vehicle includes a powertrain configured to apply a driving force to the vehicle, the power transmission device is an automatic transmission included in the powertrain.

To achieve the above object, another embodiment of the present invention provides a parking assist system (1) configured to execute an automatic parking process and/or an automatic unparking process by using the display device according to claim 1.

According to this arrangement, in a case where the travel direction of the vehicle is switched during the automatic parking process and/or the automatic unparking process, the direction indicating image can be switched at an appropriate timing, so that the discomfort of the user can be reduced.

Thus, according to the above arrangements, it is possible to provide a display device for a vehicle that can reduce the discomfort of the user by switching a direction indicating image at an appropriate timing in a case where the travel direction of the vehicle is switched.

BRIEF DESCRIPTION OF THE DRAWING(S)

DESCRIPTION OF THE PREFERRED EMBODIMENT(S)

In the following, an embodiment of the present invention will be described in detail with reference to the drawings.

A parking assist system 1 is mounted on a vehicle such as an automobile provided with a vehicle control system 2 configured to make the vehicle travel autonomously.

Figure 1:
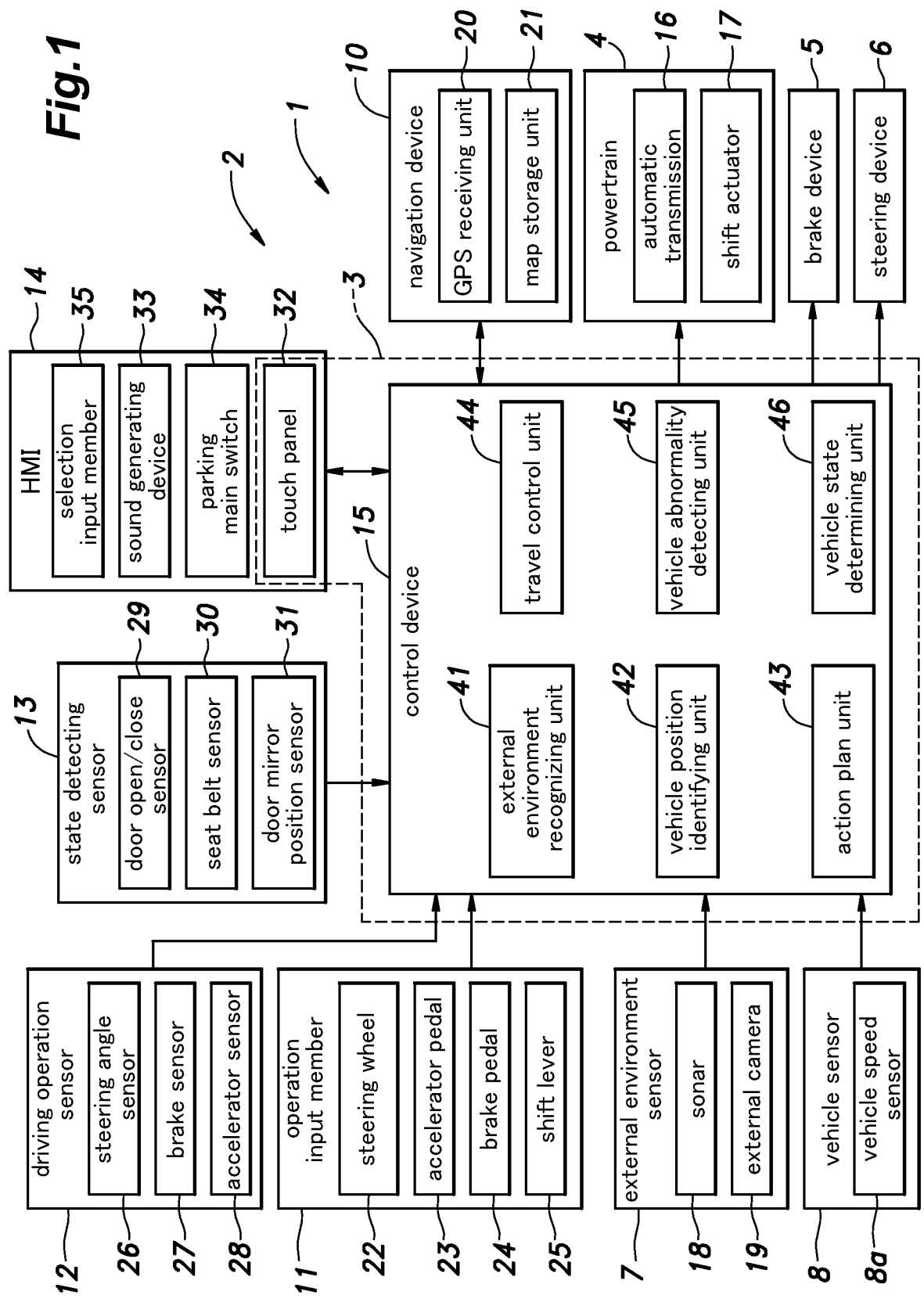
FIG. 1 is a functional block diagram of a vehicle provided with a parking assist system according to an embodiment of the present invention.

As shown in FIG. 1, the vehicle control system 2 includes a powertrain 4, a brake device 5, a steering device 6, an external environment sensor 7, a vehicle sensor 8, a navigation device 10, an operation input member 11, a driving operation sensor 12, a state detecting sensor 13, a human machine interface (HMI) 14, and a control device 15. The above components of the vehicle control system 2 are connected to each other so that signals can be transmitted therebetween via communication means such as a Controller Area Network (CAN).

The powertrain 4 is a device configured to apply a driving force to the vehicle. The powertrain 4 includes a power source and a transmission, for example. The power source includes at least one of an internal combustion engine, such as a gasoline engine and a diesel engine, and an electric motor. In the present embodiment, the powertrain 4 includes an automatic transmission 16 (an example of a power transmission device) and a shift actuator 17 for changing a shift position of the automatic transmission 16 (a shift position of the vehicle). The brake device 5 is a device configured to apply a brake force to the vehicle. For example, the brake device 5 includes a brake caliper configured to press a brake pad against a brake rotor and an electric cylinder configured to supply a brake pressure (an oil pressure) to the brake caliper. The brake device 5 may include an electric parking brake device configured to restrict rotations of wheels via wire cables. The steering device 6 is a device for changing a steering angle of the wheels. For example, the steering device 6 includes a rack-and-pinion mechanism configured to steer (turn) the wheels and an electric motor configured to drive the rack-and-pinion mechanism. The powertrain 4, the brake device 5, and the steering device 6 are controlled by the control device 15.

The external environment sensor 7 serves as an external environment information acquisition device for detecting electromagnetic waves, sound waves, and the like from the surroundings of the vehicle to detect an object outside the vehicle and to acquire surrounding information of the vehicle. The external environment sensor 7 includes sonars 18 and external cameras 19. The external environment sensor 7 may further include a millimeter wave radar and/or a laser lidar. The external environment sensor 7 outputs a detection result to the control device 15.

Each sonar 18 consists of a so-called ultrasonic sensor. Each sonar 18 emits ultrasonic waves to the surroundings of the vehicle and captures the ultrasonic waves reflected by an object, thereby detecting the position (distance and direction) of the object. Plural sonars 18 are provided at each of a rear portion and a front portion of the vehicle. In the present embodiment, a pair of sonars 18 are provided on a rear bumper so as to be spaced laterally from each other, a pair of sonars 18 are provided on a front bumper so as to be spaced laterally from each other, and four sonars 18 are provided at front and rear ends of both lateral surfaces of the vehicle, respectively. Namely, the vehicle is provided with eight sonars 18 in total. The sonars 18 provided on the rear bumper mainly detect the positions of the objects behind the vehicle. The sonars 18 provided on the front bumper mainly detect the positions of the objects in front of the vehicle. The sonars 18 provided at the front ends of both lateral surfaces of the vehicle detect the positions of the objects on left and right outsides of the front end of the vehicle, respectively. The sonars 18 provided at the rear ends of both lateral surfaces of the vehicle detect the positions of the objects on left and right outsides of the rear end of the vehicle, respectively.

The external cameras 19 are devices configured to capture images around the vehicle. Each external camera 19 consists of a digital camera using a solid imaging element such as a CCD or a CMOS, for example. The external cameras 19 include a front camera for capturing an image in front of the vehicle and a rear camera for capturing an image to the rear of the vehicle. The external cameras 19 may include a pair of left and right side cameras that are provided in the vicinity of the door mirrors of the vehicle to capture images on left and right sides of the vehicle.

The vehicle sensor 8 includes a vehicle speed sensor 8a configured to detect the vehicle speed of the vehicle, an acceleration sensor configured to detect the acceleration of the vehicle, a yaw rate sensor configured to detect the angular velocity around a vertical axis of the vehicle, and a direction sensor configured to detect the direction of the vehicle. For example, the vehicle speed sensor 8a consists of plural wheel speed sensors. Each wheel speed sensor is configured to detect the wheel speed (the rotational speed of each wheel). For example, the yaw rate sensor consists of a gyro sensor.

The navigation device 10 is a device configured to obtain a current position of the vehicle and provides route guidance to a destination and the like. The navigation device 10 includes a GPS receiving unit 20 and a map storage unit 21. The GPS receiving unit 20 identifies a position (latitude and longitude) of the vehicle based on a signal received from an artificial satellite (positioning satellite). The map storage unit 21 consists of a known storage device such as a flash memory or a hard disk, and stores map information.

The operation input member 11 is provided in a vehicle cabin to receive an input operation performed by the occupant (user) to control the vehicle. The operation input member 11 includes a steering wheel 22, an accelerator pedal 23, a brake pedal 24 (brake input member), and a shift lever 25 (shift member). The shift lever 25 is configured to receive an operation for switching the shift position of the vehicle.

The driving operation sensor 12 detects an operation amount of the operation input member 11. The driving operation sensor 12 includes a steering angle sensor 26 configured to detect a turning angle of the steering wheel 22, a brake sensor 27 configured to detect a pressing amount of the brake pedal 24, and an accelerator sensor 28 configured to detect a pressing amount of the accelerator pedal 23. The driving operation sensor 12 outputs a detected operation amount to the control device 15.

The state detecting sensor 13 is a sensor configured to detect a change in a state of the vehicle according to an operation by the occupant. The operation by the occupant detected by the state detecting sensor 13 includes an operation indicating an alighting intention (intention to alight from the vehicle) of the occupant and an operation indicating absence of an intention of the occupant to check the surroundings of the vehicle during an autonomous parking operation or an autonomous unparking operation. The state detecting sensor 13 includes, as sensors for detecting the operation indicating the alighting intention, a door open/close sensor 29 configured to detect opening and/or closing of a door of the vehicle and a seat belt sensor 30 configured to detect a fastening state of a seat belt. The state detecting sensor 13 includes, as a sensor to detect the operation corresponding to the abdicating intention, a door mirror position sensor 31 configured to detect a position of a door mirror. The state detecting sensor 13 outputs a signal indicating a detected change in the state of the vehicle to the control device 15.

The HMI 14 is an input/output device for receiving an input operation by the occupant and notifying the occupant of various kinds of information by display and/or voice. The HMI 14 includes, for example, a touch panel 32 that includes a display screen such as a liquid crystal display or an organic EL display and is configured to receive the input operation by the occupant, a sound generating device 33 such as a buzzer or a speaker, a parking main switch 34, and a selection input member 35. The parking main switch 34 receives the input operation by the occupant to execute selected one of an automatic parking process (autonomous parking operation) and an automatic unparking process (autonomous unparking operation). The parking main switch 34 is a so-called momentary switch that is turned on only while a pressing operation (pushing operation) is performed by the occupant. The selection input member 35 receives a selection operation by the occupant related to selection of the automatic parking process and the automatic unparking process. The selection input member 35 may consist of a rotary select switch, which preferably requires pressing as the selection operation.

The control device 15 consists of an electronic control unit (ECU) that includes a CPU, a nonvolatile memory such as a ROM, a volatile memory such as a RAM, and the like. The CPU executes operation processing according to a program so that the control device 15 executes various types of vehicle control. The control device 15 may consist of one piece of hardware, or may consist of a unit including multiple pieces of hardware. Further, the functions of the control device 15 may be at least partially executed by hardware such as an LSI, an ASIC, and an FPGA, or may be executed by a combination of software and hardware.

Further, the control device 15 executes an arithmetic process according to a program and thereby performs a conversion process of an image (video) captured by the external cameras 19 so as to generate a look-down image corresponding to a plan view of the vehicle and its surrounding area and a bird's-eye image corresponding to a three-dimensional image of the vehicle and a part of its surrounding area positioned in the travel direction as viewed from above. The control device 15 may generate the look-down image by combining the images of the front camera, the rear camera, and the left and right side cameras, and may generate the bird's-eye image by combining the image captured by the front camera or the rear camera facing the travel direction and the images captured by the left and right side cameras.

The parking assist system 1 is a system for executing the so-called automatic parking process and the so-called automatic unparking process, in which a vehicle is moved autonomously to a prescribed target position (a target parking position or a target unparking position) selected by the occupant so as to park or unpark the vehicle.

The parking assist system 1 includes the powertrain 4, the brake device 5, the steering device 6, the vehicle sensor 8, the HMI 14, and the control device 15. The touch panel 32 (an example of the image display unit) of the HMI 14 and the control device 15 compose a display device 3 for a vehicle (hereinafter abbreviated as "the display device 3").

The control device 15 controls the powertrain 4, the brake device 5, and the steering device 6 so as to execute an autonomous parking operation to move the vehicle autonomously to a target parking position and park the vehicle at the target parking position and an autonomous unparking operation to move the vehicle autonomously to a target unparking position and unpark the vehicle at the target unparking position. In order to execute such operations, the control device 15 includes an external environment recognizing unit 41, a vehicle position identifying unit 42, an action plan unit 43, a travel control unit 44, a vehicle abnormality detecting unit 45, and a vehicle state determining unit 46.

The external environment recognizing unit 41 recognizes an obstacle (for example, a parked vehicle or a wall) that is present around the vehicle based on the detection result of the external environment sensor 7, and thereby obtains information about the obstacle. Further, the external environment recognizing unit 41 analyzes the images captured by the external cameras 19 based on a known image analysis method such as pattern matching, and thereby determines whether a vehicle stopper (wheel stopper) or an obstacle is present, and obtains the size of the vehicle stopper or the obstacle in a case where the vehicle stopper or the obstacle is present. Further, the external environment recognizing unit 41 may compute a distance to the obstacle based on signals from the sonars 18 to obtain the position of the obstacle.

Also, by the analysis of the detection result of the external environment sensor 7 (more specifically, by the analysis of the images captured by the external cameras 19 based on a known image analysis method such as pattern matching), the external environment recognizing unit 41 can acquire, for example, a lane on a road delimited by road signs and a parking space delimited by white lines and the like provided on a surface of a road, a parking lot, and the like.

The vehicle position identifying unit 42 identifies the position of the vehicle (the own vehicle) based on a signal from the GPS receiving unit 20 of the navigation device 10. Further, the vehicle position identifying unit 42 may obtain the vehicle speed and the yaw rate from the vehicle sensor 8, in addition to the signal from the GPS receiving unit 20, and identify the position and posture of the vehicle by the so-called inertial navigation.

The travel control unit 44 controls the powertrain 4, the brake device 5, and the steering device 6 based on a travel control instruction from the action plan unit 43 to make the vehicle travel.

The vehicle abnormality detecting unit 45 detects an abnormality of the vehicle (hereinafter referred to as "vehicle abnormality") based on signals from various devices and sensors. The vehicle abnormality detected by the vehicle abnormality detecting unit 45 includes failure of various devices necessary for driving the vehicle (for example, the powertrain 4, the brake device 5, and the steering device 6) and failure of various sensors necessary for making the vehicle travel autonomously (for example, the external environment sensor 7, the vehicle sensor 8, and the GPS receiving unit 20). Further, the vehicle abnormality includes failure of the HMI 14.

The vehicle state determining unit 46 acquires the state of the vehicle based on signals from various sensors provided in the vehicle, and determines whether the vehicle is in a prohibition state in which the autonomous movement (namely, the autonomous parking operation or the autonomous unparking operation) of the vehicle should be prohibited. The vehicle state determining unit 46 determines that the vehicle is in the prohibition state when the occupant performs a driving operation (override operation) of the operation input member 11. The override operation is an operation to override (cancel) the autonomous movement (namely, the autonomous parking operation or the autonomous unparking operation) of the vehicle.

Further, the vehicle state determining unit 46 determines, based on the detection result of the state detecting sensor 13, that the vehicle is in the prohibition state when the vehicle is in a state that reflects the alighting intention (intention to alight from the vehicle) of the occupant. More specifically, when the door open/close sensor 29 detects that the door is opened, the vehicle state determining unit 46 determines that the vehicle is in the prohibition state. Also, when the seat belt sensor 30 detects that the seat belt is released, the vehicle state determining unit 46 determines that the vehicle is in the prohibition state.

Further, the vehicle state determining unit 46 determines, based on the detection result of the state detecting sensor 13, that the vehicle is in the prohibition state when the vehicle is in a state that reflects the absence of intention of the occupant to check the surroundings of the vehicle. More specifically, the vehicle state determining unit 46 determines that the vehicle is in the prohibition state when the door mirror position sensor 31 detects that the door mirror is retracted.

The action plan unit 43 executes the automatic parking process (autonomous parking operation) or the automatic unparking process (autonomous unparking operation) when the vehicle is in a prescribed state and the HMI 14 or the parking main switch 34 receives a prescribed input by the user, which corresponds to a request for the automatic parking process or the automatic unparking process. More specifically, the action plan unit 43 executes the automatic parking process in a case where a prescribed input corresponding to the automatic parking process is performed when the vehicle is stopped or the vehicle is traveling at a low speed equal to or less than a prescribed vehicle speed (a vehicle speed at which a parking position candidate can be searched for). The action plan unit 43 executes the automatic unparking process (parallel unparking process) in a case where a prescribed input corresponding to the automatic unparking process is performed when the vehicle is stopped. The selection of the process to be executed (the automatic parking process or the automatic unparking process) may be made by the action plan unit 43 based on the state of the vehicle. Alternatively, the above selection may be made by the occupant via the touch panel 32 or the selection input member 35. When executing the automatic parking process, the action plan unit 43 first makes the touch panel 32 display a parking search screen for setting the target parking position. After the target parking position is set, the action plan unit 43 makes the touch panel 32 display a parking screen. When executing the automatic unparking process, the action plan unit 43 first makes the touch panel 32 display an unparking search screen for setting the target unparking position. After the target unparking position is set, the action plan unit 43 makes the touch panel 32 display an unparking screen.

Figure 2:
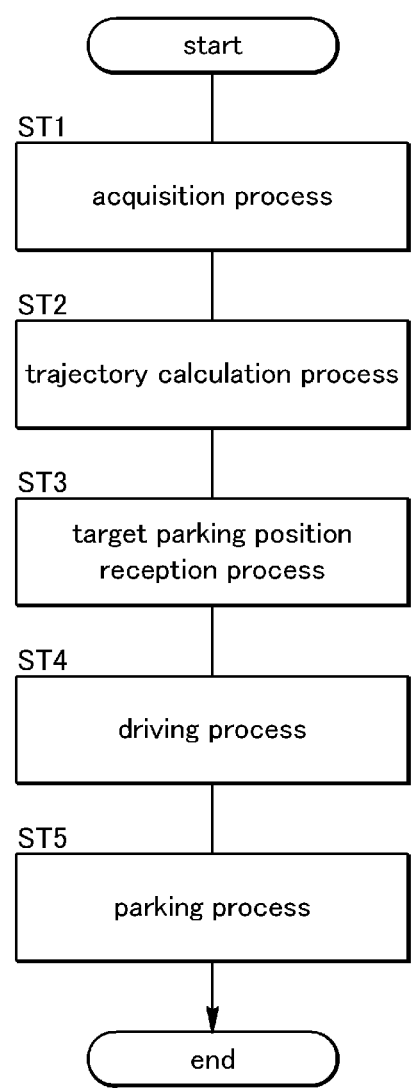
FIG. 2 is a flowchart of an automatic parking process in the parking assist system according to the embodiment.

In the following, the automatic parking process will be described with reference to FIG. 2. The action plan unit 43 first executes an acquisition process (step ST1) to acquire one or more parking spaces, if any. More specifically, in a case where the vehicle is stopped, the action plan unit 43 first makes the touch panel 32 of the HMI 14 display a notification that instructs the occupant to move the vehicle straight. While the occupant sitting in the driver's seat (hereinafter referred to as "driver") is moving the vehicle straight, the external environment recognizing unit 41 acquires, based on a signal from the external environment sensor 7, a position and size of each detected obstacle and positions of the white lines provided on the road surface. The external environment recognizing unit 41 extracts, based on the acquired position and size of the obstacle and the acquired positions of the white lines, one or more undelimited parking spaces and one or more delimited parking spaces, if any (hereinafter, the undelimited parking spaces and the delimited parking spaces will be collectively referred to as "parking spaces"). Each undelimited parking space is a space that is not delimited by the white lines or the like, has a size sufficient to park the vehicle, and is available (namely, there is no obstacle therein). Each delimited parking space is a space that is delimited by the white lines or the like, has a size sufficient to park the vehicle, and is available (namely, another vehicle (vehicle other than the own vehicle) is not parked).

Next, the action plan unit 43 executes a trajectory calculation process (step ST2) to calculate a trajectory of the vehicle from a current position of the vehicle to each extracted parking space. In a case where the trajectory of the vehicle can be calculated for a certain parking space, the action plan unit 43 sets the parking space as a parking position candidate where the vehicle can be parked, and make the touch panel 32 display the parking position candidate on the screen (the parking search screen). In a case where the trajectory of the vehicle cannot be calculated due to the presence of the obstacle, the action plan unit 43 does not set the parking space as a parking position candidate and does not make the touch panel 32 display the parking space on the screen. When the action plan unit 43 sets multiple parking position candidates (namely, multiple parking places for which the trajectory of the vehicle can be calculated), the action plan unit 43 makes the touch panel 32 display these parking position candidates.

Figure 3A:
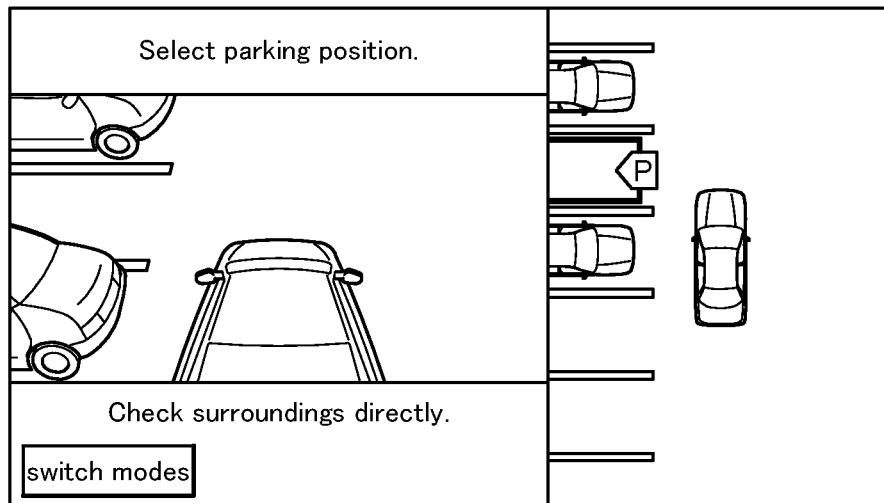
FIG. 3A is a diagram showing a screen display of a touch panel during a target parking position reception process in the parking assist system according to the embodiment.

Next, the action plan unit 43 executes a target parking position reception process (step ST3) to receive a selection operation performed by the occupant to select the target parking position, which is a parking position where the occupant wants to park the vehicle, and is selected from the one or more parking position candidates displayed on the touch panel 32. More specifically, the action plan unit 43 makes the touch panel 32 display the look-down image and the bird's-eye image in the travel direction on the parking search screen shown in FIG. 3A. When the action plan unit 43 acquires at least one parking position candidate, the action plan unit 43 makes the touch panel 32 display a frame that indicates the parking position candidate and an icon that corresponds to the frame in at least one of the look-down image and the bird's-eye image (in the look-down image in FIG. 3A) in an overlapping manner. The icon consists of a symbol indicating the parking position candidate (see "P" in FIG. 3A). Also, the action plan unit 43 makes the touch panel 32 display the parking search screen including a notification that instructs the driver to stop the vehicle and select the target parking position, so that the touch panel 32 receives the selection operation of the target parking position. The selection operation of the target parking position may be performed via the touch panel 32, or may be performed via the selection input member 35.

Figure 3B:
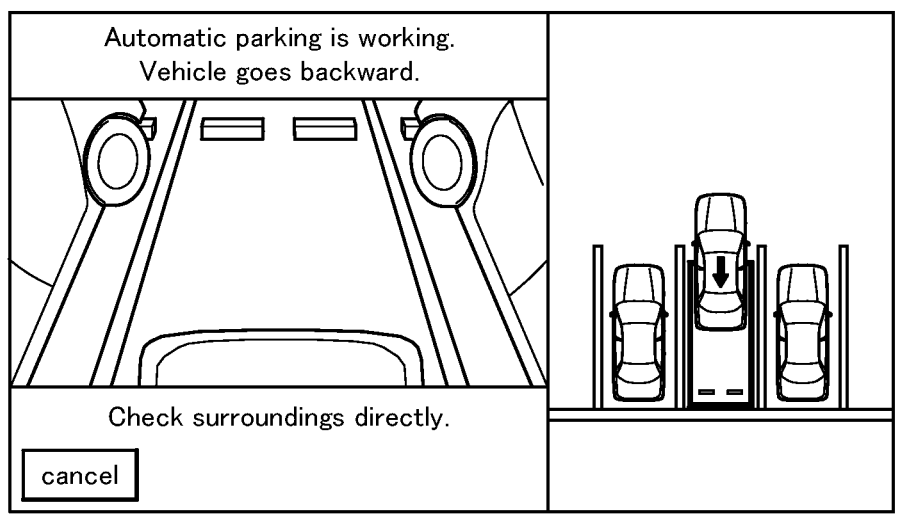
FIG. 3B is a diagram showing the screen display of the touch panel during a driving process in the parking assist system according to the embodiment.

After the vehicle is stopped and the target parking position is selected by the driver, the action plan unit 43 makes the touch panel 32 switch the screen from the parking search screen to the parking screen. As shown in FIG. 3B, the parking screen is a screen in which an image in the travel direction of the vehicle (hereinafter referred to as "travel direction image") is displayed on the left half of the touch panel 32 and the look-down image including the vehicle and its surrounding area is displayed on the right half thereof. At this time, the action plan unit 43 may make the touch panel 32 display a thick frame that indicates the target parking position selected from the parking position candidates and an icon that corresponds to the thick frame such that the thick frame and the icon overlap with the look-down image. This icon consists of a symbol indicating the target parking position, and is shown in a color different from the symbol indicating the parking position candidate.

After the target parking position is selected and the screen of the touch panel 32 is switched to the parking screen, the action plan unit 43 executes a driving process (step ST4) to make the vehicle travel along the calculated trajectory. At this time, the action plan unit 43 controls the vehicle based on the position of the vehicle acquired by the GPS receiving unit 20 and the signals from the external cameras 19, the vehicle sensor 8, and the like so that the vehicle travels along the calculated trajectory. At this time, the action plan unit 43 controls the powertrain 4, the brake device 5, and the steering device 6 so as to execute a switching operation for switching the travel direction of the vehicle (a reversing operation for reversing the travel direction of the vehicle). The switching operation may be executed repeatedly, or may be executed only once.

During the driving process, the action plan unit 43 may acquire the travel direction image from the external cameras 19 and make the touch panel 32 display the acquired travel direction image on the left half thereof. For example, as shown in FIG. 3B, when the vehicle is moving backward, the action plan unit 43 may make the touch panel 32 display an image to the rear of the vehicle captured by the external cameras 19 on the left half thereof. While the action plan unit 43 is executing the driving process, the surrounding image of the vehicle (the own vehicle) in the look-down image displayed on the right half of the touch panel 32 changes along with the movement of the vehicle. When the vehicle reaches the target parking position, the action plan unit 43 stops the vehicle and ends the driving process.

Figure 3C:
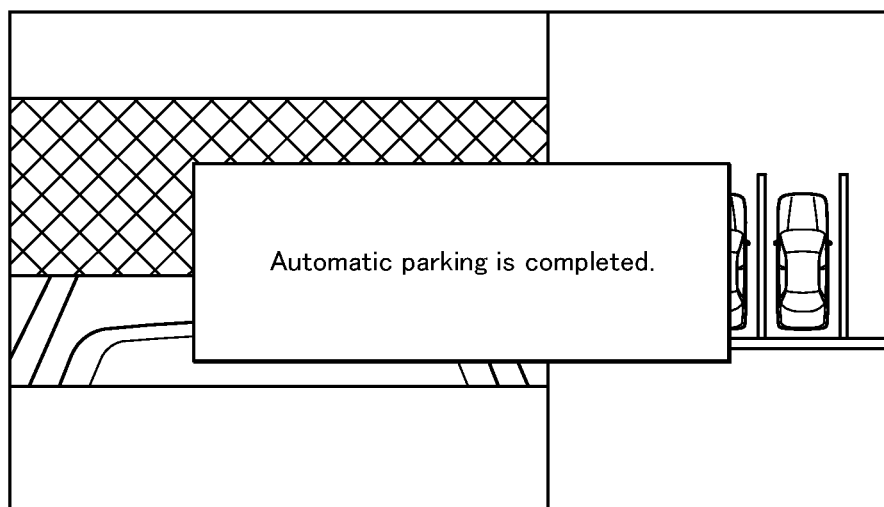
FIG. 3C is a diagram showing the screen display of the touch panel when automatic parking is completed in the parking assist system according to the embodiment.

When the driving process ends, the action plan unit 43 executes a parking process (step ST5). In the parking process, the action plan unit 43 first drives the shift actuator 17 to set the shift position (shift range) to a parking position (parking range). Thereafter, the action plan unit 43 drives the parking brake device, and makes the touch panel 32 display a pop-up window (see FIG. 3C) indicating that the automatic parking of the vehicle has been completed. The pop-up window may be displayed on the screen of the touch panel 32 for a prescribed period. Thereafter, the action plan unit 43 may make the touch panel 32 switch the screen to an operation screen of the navigation device 10 or a map screen.

In the parking process, there may be a case where the shift position cannot be changed to the parking position because of an abnormality of the shift actuator 17 or a case where the parking brake device cannot be driven because of an abnormality of the parking brake device. In these cases, the action plan unit 43 may make the touch panel 32 display the cause of the abnormality on the screen thereof.

<The Travel Control of the Vehicle V>

The control device 15 executes automatic travel control of the vehicle V when executing the automatic parking process and/or the automatic unparking process of the vehicle V. This automatic travel control of the vehicle V includes the control of the vehicle speed of the vehicle V, the control of the shift position of the automatic transmission 16 (an example of a state of the power transmission device), and the control of the steering state of the vehicle V. In the present embodiment, the shift position of the automatic transmission 16, which can be operated by the occupant (an example of the user) is cited as an example of the state of the power transmission device. In another embodiment, an internal state of the automatic transmission 16, which cannot be operated by the occupant, may be cited as an example of the state of the power transmission device.

The control device 15 controls the powertrain 4 and the brake device 5 based on the vehicle speed detected by the vehicle speed sensor 8a, thereby controlling the vehicle speed. For example, in a case where the vehicle speed detected by the vehicle speed sensor 8a is less than a target value, the control device 15 increases the driving force applied to the vehicle V by the powertrain 4, thereby accelerating the vehicle V. In a case where the vehicle speed detected by the vehicle speed sensor 8a exceeds the target value, the control device 15 decreases the driving force applied to the vehicle V by the powertrain 4 or increases the brake force applied to the vehicle V by the brake device 5, thereby decelerating the vehicle V.

The control device 15 controls the shift actuator 17, thereby controlling the shift position of the automatic transmission 16. For example, in a case where the vehicle V moves forward, the control device 15 sets the shift position of the automatic transmission 16 to a forward position D (an example of a first state). In a case where the vehicle V moves backward, the control device 15 sets the shift position of the automatic transmission 16 to a reverse position R (an example of a second state). In a case where the vehicle V keeps a stopped state, the control device 15 sets the shift position of the automatic transmission 16 to a parking position P.

The control device 15 controls the steering device 6, thereby controlling the steering angle of the wheels (an example of the steering state of the vehicle V). For example, in a case where the vehicle V turns to the left, the control device 15 changes the steering angle of the wheels from zero degrees (the reference position) to the left. In a case where the vehicle V turns to the right, the control device 15 changes the steering angle of the wheels from zero degrees to the right. In another embodiment, a parameter (for example, the turning angle of the steering wheel 22) other than the steering angle of the wheels may be cited as an example of the steering state of the vehicle V.

<The Driving Process>

Figure 4:
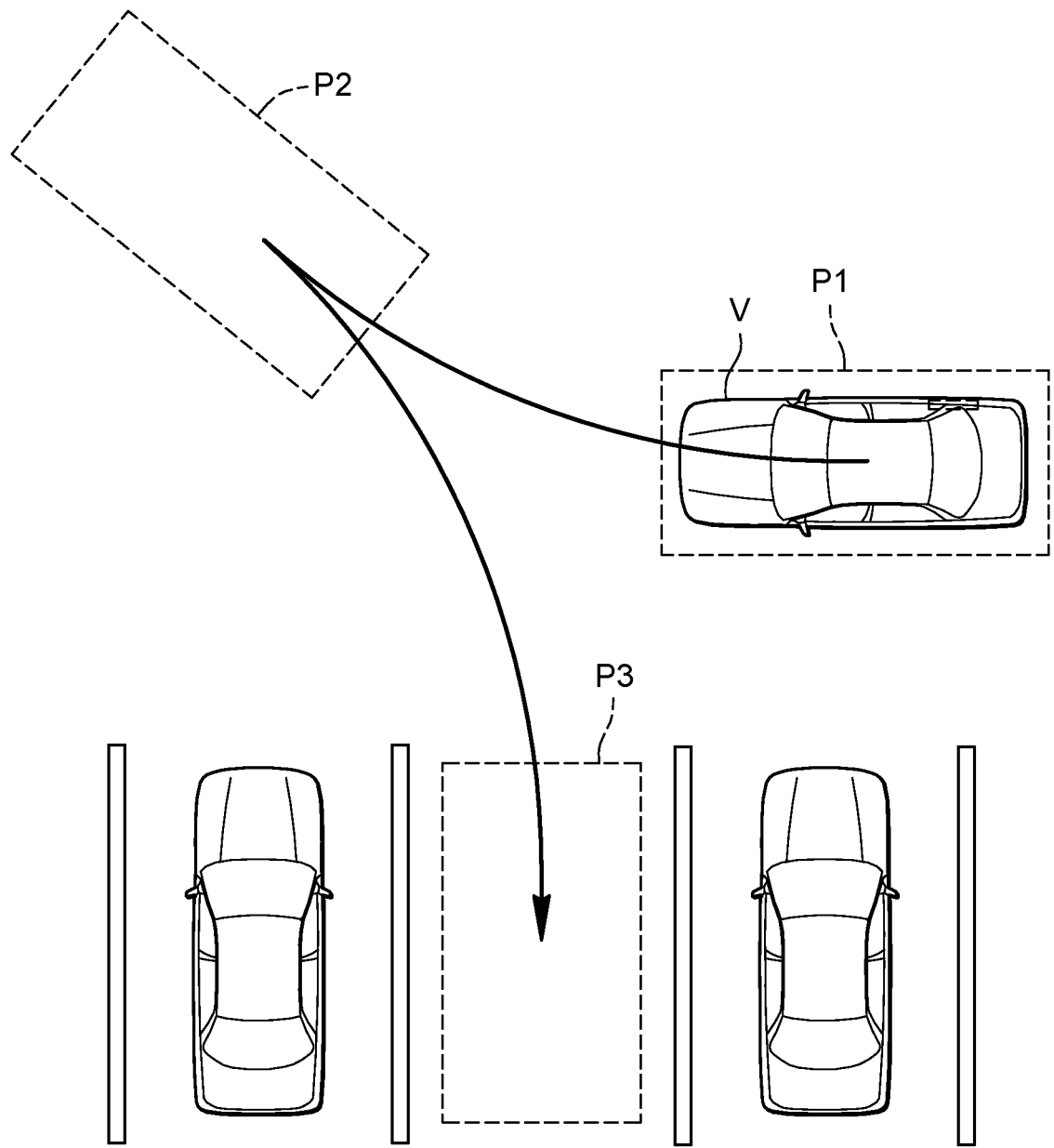
FIG. 4 is a plan view for explaining the driving process in the parking assist system according to the embodiment.

Next, with reference to FIGS. 4 to 6, the driving process (step ST4) in the above automatic parking process will be described. As shown in FIG. 4, in the present embodiment, the control device 15 moves the vehicle V forward from a parking starting position P1, switches the travel direction of the vehicle V at a switching position P2, and then moves the vehicle V backward to a target parking position P3. In the present embodiment, the control device 15 switches the travel direction of the vehicle V only once in the driving process. In another embodiment, the control device 15 may switch the travel direction of the vehicle V plural times in the driving process.

Figure 5A:
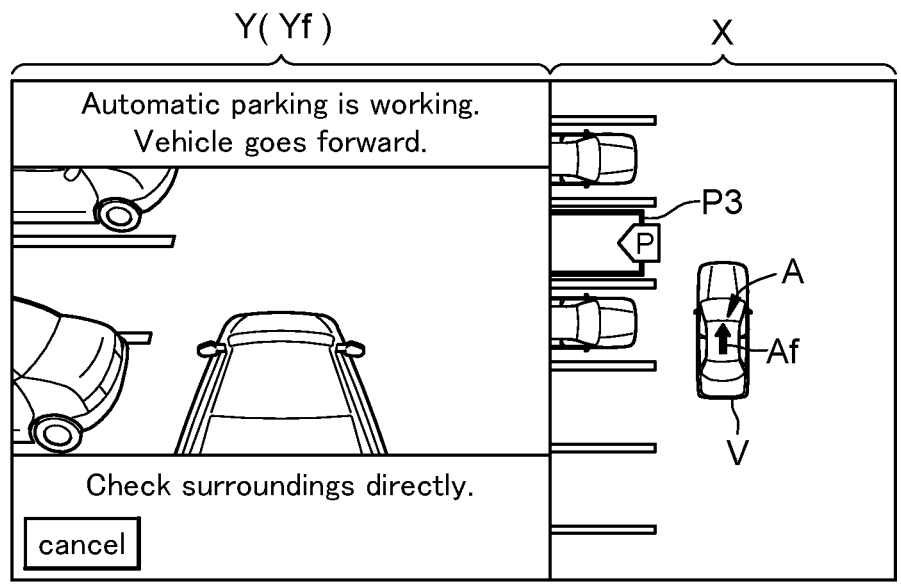
FIG. 5A is a diagram showing a driving process screen at the start of the driving process in the parking assist system according to the embodiment.

When the driving process is started in response to the input operation on the parking main switch 34 by the occupant, the touch panel 32 displays a driving process screen (see FIG. 5A). Further, the touch panel 32 simultaneously displays a plan view image X and a travel direction image Y on the driving process screen. For example, the touch panel 32 displays the plan view image X in the right half of the driving process screen and the travel direction image Y in the left half of the driving process screen.

The plan view image X is an image in which the vehicle V (namely, the own vehicle) and its surrounding area are looked down on from right above. In the center of the plan view image X, a direction indicating image A is displayed so as to overlap with an image of the vehicle V. The direction indicating image A is an image that indicates the travel direction of the vehicle V. For example, the direction indicating image A is an arrow that indicates the travel direction of the vehicle V. In another embodiment, the direction indicating image A may be displayed at a position where the direction indicating image A does not overlap with the image of the vehicle V. In still another embodiment, the direction indicating image A may be an image (for example, a graphic image (a circle, a triangle, or the like) or a character image) other than an arrow. The direction indicating image A is switchable between a forward arrow Af (an example of a first image: see FIG. 5A) and a reverse arrow Ar (an example of a second image: see FIG. 5C). The forward arrow Af is directed upward, and indicates a forward direction (an example of a first travel direction) of the vehicle V. The reverse arrow Ar is directed downward, and indicates a reverse direction (an example of a second travel direction) of the vehicle V. In the present embodiment, the touch panel 32 displays the forward arrow Af in the plan view image X at the start of the driving process (see FIG. 5A).

The travel direction image Y is an image in which the travel direction of the vehicle V is projected. The travel direction image Y is switchable between a front image Yf (an example of a first travel direction image: see FIGS. 5A and 5B) in which the front of the vehicle V is projected and a rear image Yr (an example of a second travel direction image: see FIG. 5C) in which the rear of the vehicle V is projected. In the present embodiment, the front image Yf is displayed as the travel direction image Y at the start of the driving process (see FIG. 5A).

Further, when the driving process is started, the control device 15 changes the steering angle of the wheels from zero degrees to the right, and changes the shift position of the automatic transmission 16 from the parking position P to the forward position D. Further, when the driving process is started, the control device 15 drives the power source of the powertrain 4, thereby increasing the driving force applied to the vehicle V by the powertrain 4 from zero. Further, the control device 15 decreases the brake pressure of the brake device 5, thereby decreasing the brake force applied to the vehicle V by the brake device 5. Accordingly, the vehicle V starts moving forward.

When the vehicle V approaches the switching position P2 by continuing the forward movement, the control device 15 stops driving the power source of the powertrain 4. Accordingly, as shown in FIG. 6, the driving force applied to the vehicle V by the powertrain 4 becomes zero at time T1. Further, a brake instruction signal from the control device 15 to the brake device 5 is switched from OFF to ON at time T1. Accordingly, the brake pressure of the brake device 5 increases, and thus the brake force applied to the vehicle V by the brake device 5 increases. Consequently, the vehicle speed of the vehicle V gradually decreases. When the vehicle V reaches the switching position P2 at time T2, the vehicle speed of the vehicle V becomes zero. Namely, the vehicle V stops at the switching position P2 at time T2.

Figure 5B:
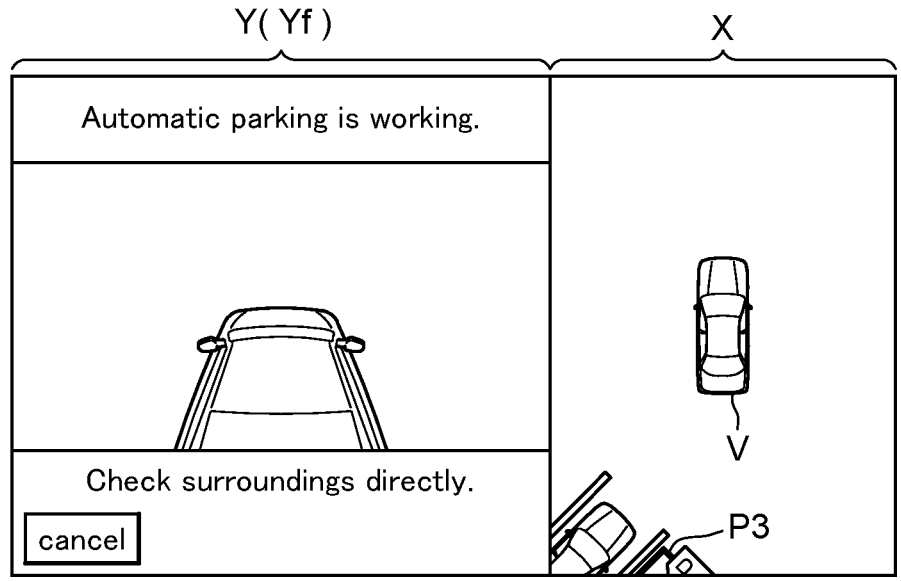
FIG. 5B is a diagram showing the driving process screen when the vehicle stops at a switching position in the parking assist system according to the embodiment.

Further, when the vehicle V stops at the switching position P2 at time T2, the touch panel 32 stops displaying the forward arrow Af in the plan view image X (see FIG. 5B). Accordingly, the display of the direction indicating image A in the plan view image X is stopped.

Figure 6:
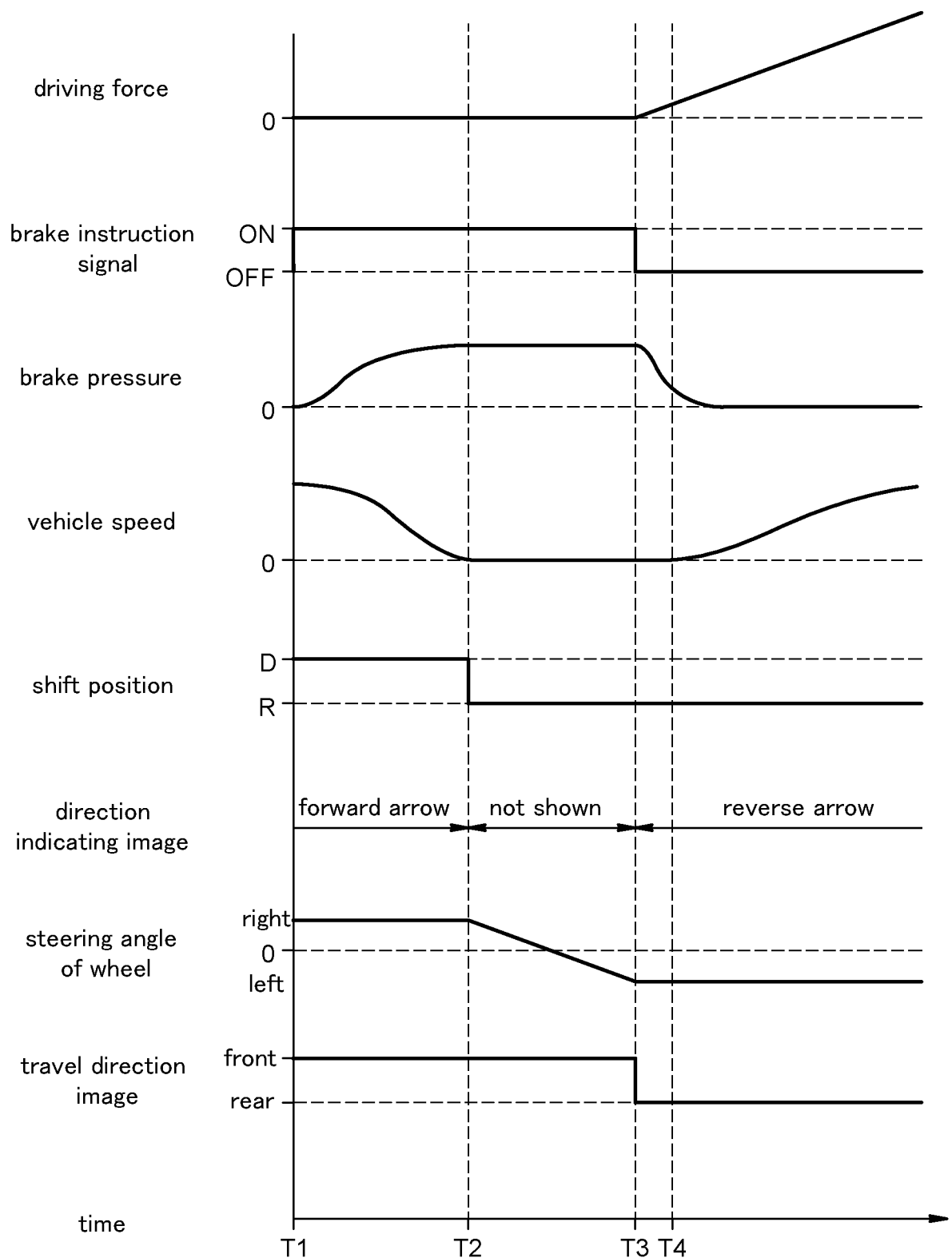
FIG. 6 is a timing diagram of the driving process in the parking assist system according to the embodiment.

Further, as shown in FIG. 6, when the vehicle V stops at the switching position P2 at time T2, the control device 15 changes the steering angle of the wheels from right to left in a state where the vehicle V is stopped at the switching position P2. In another embodiment, when executing such a changing process of the steering angle of the wheels, the control device 15 may slightly move the vehicle V back and forth at the switching position P2 in order to reduce the torque required to change the steering angle of the wheels.

Figure 5C:
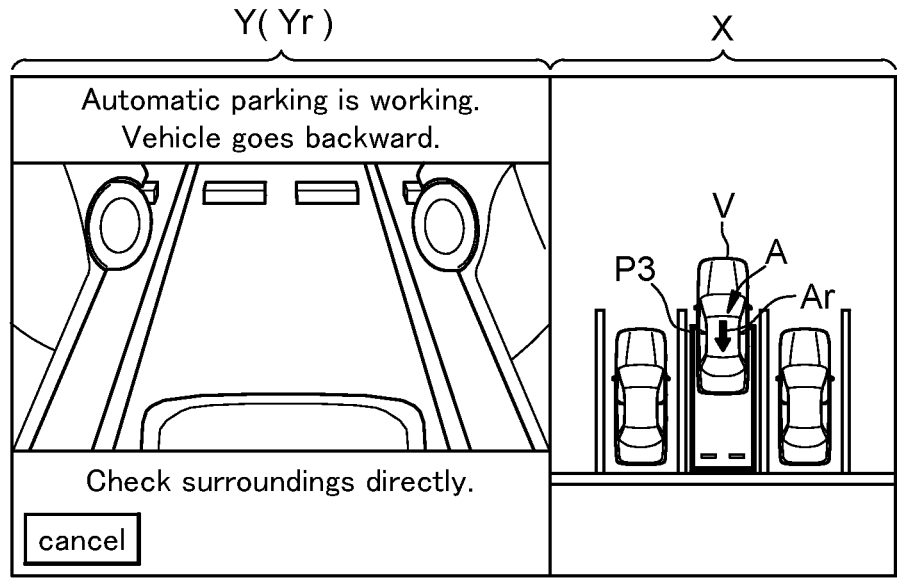
FIG. 5C is a diagram showing the driving process screen when the vehicle moves backward in the parking assist system according to the embodiment.

When the change in the steering angle of the wheels is completed at time T3, the touch panel 32 starts displaying the reverse arrow Ar in the plan view image X, and switches the travel direction image Y from the front image Yf to the rear image Yr (see FIG. 5C). Namely, the timing at which the touch panel 32 starts displaying the reverse arrow Ar in the plan view image X matches the timing at which the touch panel 32 switches the travel direction image Y from the front image Yf to the rear image Yr.

Further, when the change in the steering angle of the wheels is completed at time T3, the control device 15 drives the power source of the powertrain 4, thereby increasing the driving force applied to the vehicle V by the powertrain 4 from zero. Further, when the change in the steering angle of the wheels is completed at time T3, the brake instruction signal from the control device 15 to the brake device 5 is switched from ON to OFF. Accordingly, the brake pressure of the brake device 5 decreases, and thus the brake force applied to the vehicle V by the brake device 5 decreases. Accordingly, the vehicle speed of the vehicle V starts increasing from zero at time T4, which comes shortly after time T3. Namely, the vehicle V starts moving backward at time T4.

When the vehicle V approaches the target parking position P3 by continuing the backward movement, the vehicle speed of the vehicle V gradually decreases by a similar action to the time when the vehicle V approaches the switching position P2. When the vehicle V reaches the target parking position P3, the vehicle speed of the vehicle V becomes zero. Namely, the vehicle V stops at the target parking position P3. Thus, the driving process ends.

As described above, in a case where the control device 15 switches the travel direction of the vehicle V from the forward direction to the reverse direction, the touch panel 32 switches the direction indicating image A from the forward arrow Af to the reverse arrow Ar based on the vehicle speed of the vehicle V, the shift position of the automatic transmission 16, and the steering angle of the wheels. In this way, a switching timing of the direction indicating image A is determined based on the vehicle speed of the vehicle V, the shift position of the automatic transmission 16, and the steering angle of the wheels. Accordingly, it is possible to suppress a time difference between a switching timing of the travel state or the steering state of the vehicle V and the switching timing of the direction indicating image A, as compared with a case where the switching timing of the direction indicating image A is determined based only on the shift position of the automatic transmission 16. Thus, the direction indicating image A can be switched at an appropriate timing, so that the discomfort of the occupant (an example of the user) caused by the switch in the direction indicating image A can be reduced.

Further, the touch panel 32 stops displaying the forward arrow Af when or after the vehicle speed in the forward direction becomes zero, and starts displaying the reverse arrow Ar after a period in which the direction indicating image A is not displayed elapses and before the vehicle speed increases from zero. Thus, the display of the direction indicating image A is stopped as the vehicle V stops moving. Accordingly, it is possible to shorten a period in which the direction indicating image A is displayed even though the vehicle V is stopped. Thus, the discomfort of the occupant caused by the switch in the direction indicating image A can be further reduced. Further, the display of the reverse arrow Ar is started before the vehicle speed increases from zero. Accordingly, the occupant can easily anticipate that the vehicle V will move backward.

Further, the touch panel 32 starts displaying the reverse arrow Ar after the shift position of the automatic transmission 16 is switched from the forward position D to the reverse position R. Thus, the display of the reverse arrow Ar is started after the shift position of the automatic transmission 16 is switched. Accordingly, it is possible to shorten a period in which the reverse arrow Ar is displayed even though the vehicle V is stopped, as compared with a case where the display of the reverse arrow Ar is started before the shift position of the automatic transmission 16 is switched. Thus, the discomfort of the occupant caused by the switch in the direction indicating image A can be further reduced. In another embodiment, the touch panel 32 may start displaying the reverse arrow Ar when the shift position of the automatic transmission 16 is switched from the forward position D to the reverse position R. Namely, it is preferable that the touch panel 32 starts displaying the reverse arrow Ar when or after the shift position of the automatic transmission 16 is switched from the forward position D to the reverse position R.

Further, the touch panel 32 starts displaying the reverse arrow Ar when the change in the steering angle of the wheels is completed. Thus, the display of the reverse arrow Ar is started when an adjustment of the steering state is completed. Accordingly, it is possible to shorten a period in which the reverse arrow Ar is displayed even though the vehicle V is stopped, as compared with a case where the display of the reverse arrow Ar is started before the adjustment of the steering state is completed. Thus, the discomfort of the occupant caused by the switch in the direction indicating image A can be further reduced. In another embodiment, the touch panel 32 may start displaying the reverse arrow Ar after the change in the steering angle of the wheels is completed. Namely, it is preferable that the touch panel 32 starts displaying the reverse arrow Ar when or after the change in the steering angle of the wheels is completed.

Further, the touch panel 32 suspends the display of the direction indicating image A while the steering angle of the wheels is being changed. Thus, the period in which the steering angle of the wheels is changed can match the period in which the display of the direction indicating image A is suspended. Thus, the discomfort of the occupant caused by the switch in the direction indicating image A can be further reduced.

Further, the touch panel 32 starts displaying the reverse arrow Ar after the vehicle V that has been moving forward stops moving by the brake force of the vehicle V and before the vehicle V starts moving backward. Thus, the occupant can easily anticipate that the vehicle V will move backward.

Further, the touch panel 32 starts displaying the reverse arrow Ar after the vehicle V that has been moving forward by the driving force of the vehicle V stops moving and before the vehicle V starts moving backward. Thus, the occupant can easily anticipate that the vehicle V will move backward.

Further, the touch panel 32 starts displaying the reverse arrow Ar when the travel direction image Y is switched from the front image Yf to the rear image Yr. Thus, a display timing of the reverse arrow Ar can match a switching timing of the travel direction image Y. Thus, the discomfort of the occupant caused by the switch in the direction indicating image A can be further reduced.

In the present embodiment, the forward direction is set to the first travel direction of the vehicle V, and the reverse direction is set to the second travel direction of the vehicle V. In another embodiment, the reverse direction may be set to the first travel direction of the vehicle V, and the forward direction may be set to the second travel direction of the vehicle V. In this case, for example, the reverse arrow Ar may be set to the first image, the forward arrow Af may be set to the second image, the rear image Yr may be set to the first travel direction image, and the front image Yf may be set to the second travel direction image. In still another embodiment, one of the left turning direction and the right turning direction may be set to the first travel direction of the vehicle V, and the other of the left turning direction and the right turning direction may be set to the second travel direction of the vehicle V.

In the present embodiment, the touch panel 32 is cited as an example of the image display unit. In another embodiment, a communication device (for example, a smartphone, a tablet PC, a mobile phone, a PDA, or the like) configured to communicate with the vehicle V may be cited as an example of the image display unit. Namely, the image display unit is not necessarily mounted on the vehicle V.

In the present embodiment, the display device 3 is applied to the parking assist system 1 configured to execute selected one of the automatic parking process and the automatic unparking process of the vehicle V. On the other hand, in another embodiment, the display device 3 may be applied to a vehicle system (for example, a vehicle travel system) other than the parking assist system 1.

Concrete embodiments of the present invention have been described in the foregoing, but the present invention should not be limited by the foregoing embodiments and various modifications and alterations are possible within the scope of the present invention.

The invention claimed is:

1. A display device for a vehicle, comprising:
an image display unit configured to display a direction indicating image that indicates a travel direction of the vehicle; and
a control device configured to execute travel control of the vehicle,
wherein the direction indicating image is switchable between a first image that indicates a first travel direction of the vehicle and a second image that indicates a second travel direction of the vehicle, the second travel direction being opposite to the first travel direction, and
in a case where the control device switches the travel direction of the vehicle from the first travel direction to the second travel direction, the image display unit switches the direction indicating image from the first image to the second image based on a vehicle speed of the vehicle, a state of a power transmission device, and a steering state of the vehicle,
wherein in a case where the steering state of the vehicle is changed as the control device switches the travel direction of the vehicle from the first travel direction to the second travel direction, the image display unit suspends a display of the direction indicating image while the steering state of the vehicle is being changed such that a period in which the steering state of the vehicle is being changed matches a period in which the display of the direction indicating image is suspended.

2. The display device according to claim 1, wherein in the case where the control device switches the travel direction of the vehicle from the first travel direction to the second travel direction, the image display unit stops displaying the first image when or after the vehicle speed in the first travel direction becomes zero, and starts displaying the second image after a period in which the direction indicating image is not displayed elapses and before the vehicle speed increases from zero.

3. The display device according to claim 1, wherein the state of the power transmission device is switchable between a first state to move the vehicle in the first travel direction and a second state to move the vehicle in the second travel direction, and
in the case where the control device switches the travel direction of the vehicle from the first travel direction to the second travel direction, the image display unit starts displaying the second image when or after the state of the power transmission device is switched from the first state to the second state.

4. The display device according to claim 1, wherein the control device is configured to control a brake force of the vehicle, and in the case where the control device switches the travel direction of the vehicle from the first travel direction to the second travel direction, the image display unit starts displaying the second image after the vehicle that has been moving in the first travel direction stops moving by the brake force of the vehicle and before the vehicle starts moving in the second travel direction.

5. The display device according to claim 1, wherein the control device is configured to control a driving force of the vehicle, and in the case where the control device switches the travel direction of the vehicle from the first travel direction to the second travel direction, the image display unit starts displaying the second image after the vehicle that has been moving in the first travel direction by the driving force of the vehicle stops moving and before the vehicle starts moving in the second travel direction.

6. The display device according to claim 1, wherein the image display unit is configured to simultaneously display a plan view image in which the vehicle is looked down on from right above and a travel direction image in which the travel direction of the vehicle is projected, the plan view image includes the direction indicating image, the travel direction image is switchable between a first travel direction image that projects the first travel direction of the vehicle and a second travel direction image that projects the second travel direction of the vehicle, and in the case where the control device switches the travel direction of the vehicle from the first travel direction to the second travel direction, the image display unit starts displaying the second image when the travel direction image is switched from the first travel direction image to the second travel direction image.

7. The display device according to claim 1, wherein the first travel direction is one of a forward direction and a reverse direction of the vehicle, and the second travel direction is another of the forward direction and the reverse direction of the vehicle.

8. The display device according to claim 1, wherein the vehicle includes a powertrain configured to apply a driving force to the vehicle, the power transmission device is an automatic transmission included in the powertrain.

9. A parking assist system configured to execute an automatic parking process and/or an automatic unparking process by using the display device according to claim 1.

* * * * *